Nov. 27, 1945.   L. R. GRUSS   2,389,849
AIRPLANE SHOCK ABSORBING DEVICE
Filed Jan. 3, 1941   2 Sheets-Sheet 1
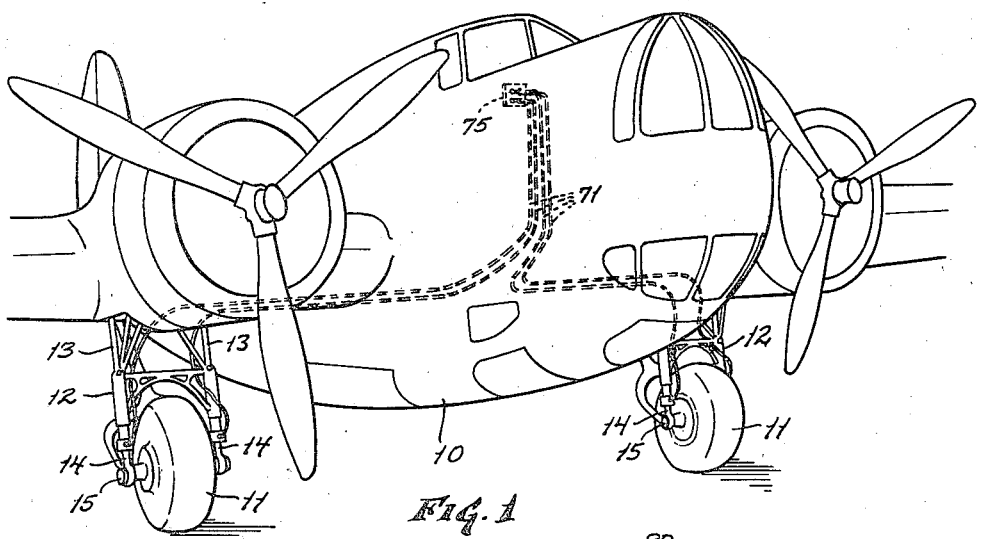
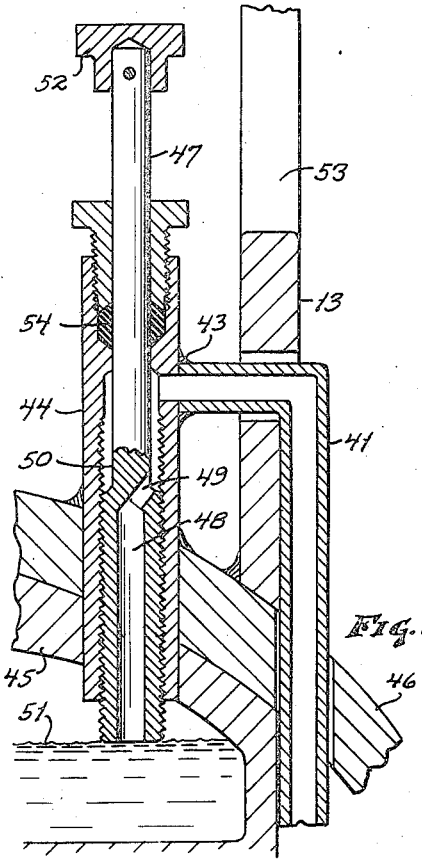
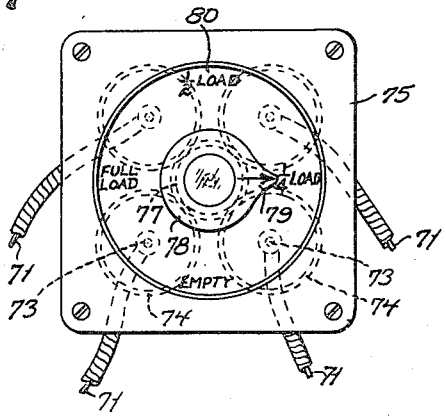
INVENTOR.
LUCIEN R. GRUSS
BY Bates, Teare, & McBean
ATTORNEYS Nov. 27, 1945.      L. R. GRUSS      2,389,849
AIRPLANE SHOCK ABSORBING DEVICE
Filed Jan. 3, 1941      2 Sheets-Sheet 2
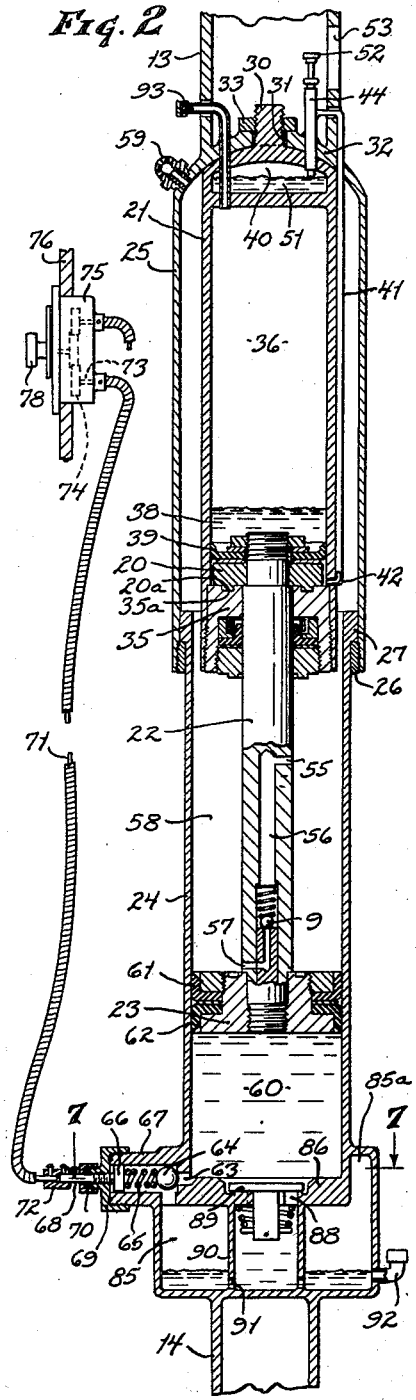
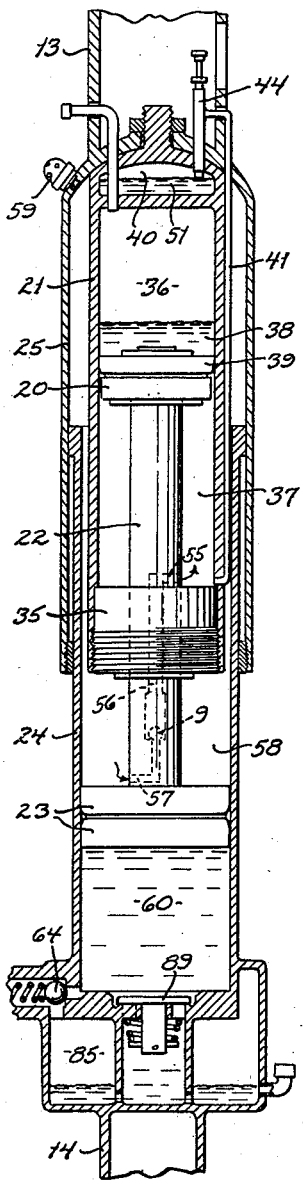
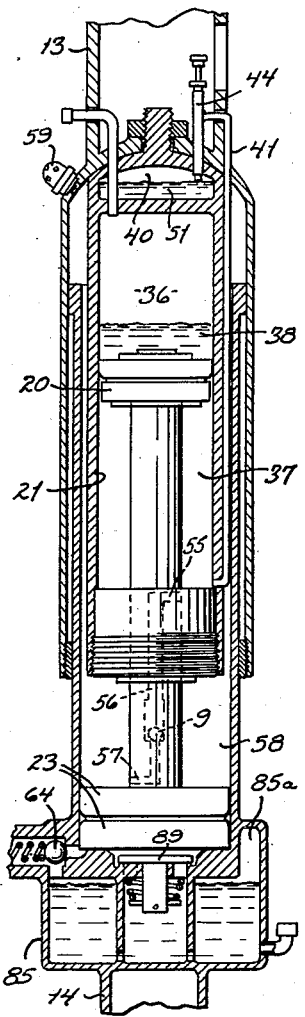
INVENTOR.
LUCIEN R. GRUSS
BY
Bates, Teare, & McBean
ATTORNEYS Patented Nov. 27, 1945

2,389,849

UNITED STATES PATENT OFFICE 2,389,849

AIRPLANE SHOCK ABSORBING DEVICE

Lucien R. Gruss, Cleveland, Ohio

Application January 3, 1941, Serial No. 372,970

9 Claims. (Cl. 267—64)

This invention relates to shock absorbers for airplanes, and is adapted for use with landing gear, either of the wheel or skid type.

Fluid actuated shock absorbers in use at the present time on airplanes are extremely heavy and require auxiliary apparatus, either in the form of a pump or a reservoir of compressed air to charge the shock absorbers at will. The pressure used in such shock absorbers varies with the load of the plane, and, therefore, must be adjusted to give the best cushioning effect in landing.

An object of the present invention is to provide a cushioning apparatus employing fluid under pressure as a cushioning medium, and so designed that the device is charged automatically to the desired pressure as the result of the movements of the plane incident to a normal take-off. This, therefore, eliminates the necessity for pumping by the pilot or the necessity for carrying additional dead weight in the form of a tank of compressed air.

An additional object of the present invention is to greatly reduce the weight of the shock absorbing mechanism, while at the same time making provision for controlling from the cockpit the degree of pressure within the cushioning mechanism in accordance with the load at the time of landing.

Referring now to the drawings, Fig. 1 is a perspective view showing an airplane structure having devices embodying my invention thereon; Figs. 2, 3 and 4 are vertical sections taken through the cushioning device to illustrate the various positions thereof during the operation of a plane; Fig. 5 is an enlarged fragmentary view showing in section a portion of the device used for regulating the capacity thereof; Fig. 6 is a front view of a controlling member which is mounted within the cockpit; Fig. 7 is a section taken on a plane indicated by the lines 7—7 in Fig. 2.

I have shown my invention in the drawings in connection with an airplane structure which is indicated in general at 10, and which has landing members in the form of wheels 11, the mounting for which is indicated in general at 12. The mounting includes a shock absorbing or cushioning device, an upper extension 13 of which is secured in any suitable manner to the airplane structure, and a lower extension 14 of which is attached in any convenient manner to the ground engaging member which in Fig. 1 embodies the axle 15 of the wheel 11.

The landing gear mounting includes a fluid pressure actuated member in the form of a piston 20, which is arranged to operate within a cylinder 21, and which is mounted at one end of a piston rod 22. A piston 23 mounted at the end of the rod 22 opposite that carrying the piston 20 is movable within the cylinder 24 which forms a lower section of a telescopic casing, the upper section of which is indicated at 25. The casing sections have interfitting bearing surfaces formed by the bearing ring 26 on the lower end of the sections 25, and by the bearing ring or collar 27, which is rigidly mounted on the upper end of the section 24. The cylinder 21 may be suspended within the casing by means of a stud 30 which is shown as an extension on the top of the cylinder and which projects through an opening 31 in the top wall 32 of the casing section 25. The stud may be threaded to receive a nut 33. Thus, the cylinder 21 is rigid with the casing section 25 but is spaced from the walls thereof and also from the walls of the section 24.

The cylinder 21 is closed at the lower end thereof by a head 35 through which the piston rod 22 extends, wherefor the piston 20 divides the cylinder 21 into an upper chamber 36 and a lower chamber 37. The upper chamber constitutes the fluid pressure reservoir which acts upon landing of the plane to cushion the force of the impact between the landing gear and the ground. As shown in Figs. 2, 3 and 4, a small quantity of oil 38 is enclosed within the chamber 36 and operates as a seal against leakage of air downwardly past the piston head 20.

The function of the mechanism embodying my invention is to maintain a pressure of air within the chamber 36 by reciprocation of the piston 20 within the cylinder 21, consequent upon the relative movements of the plane and wheels during a normal take-off. Downward movement of the piston 20 with relation to the cylinder 21 is caused by the expansion of the highly compressed air in the chamber 36 and by the action of gravity induced by the weight of the landing gear as soon as the plane starts to leave the ground, while upward movement of the piston 20 with respect to the cylinder 21 is caused by contact of the landing gear with the ground as the plane settles down at the end of a take-off hop. When first placed in operation, or after accidental loss of air pressure, upon three or four hopping movements of the plane, the piston 20 is reciprocated with respect to the cylinder 21, and as a result of such reciprocation the pressure of air within the chamber 36 is increased to the degree required for absorbing the shock incident to the landing of the plane at the end of a flight.

Where such a procedure is not possible due to roughness of terrain, for example, and a supply of compressed air is not available, an initial or additional charge of air in the chamber 36 may be obtained by jacking the plane's weight off the wheels and then allowing it to return. By repeating this operation two or three times, an ample charge of air is pumped into the air cushion as will now be explained.

Pressure of air is built up within the chamber 36 by virtue of the fact that the piston 20 carries an upwardly facing cup leather packing 39 which allows air to pass upwardly from the chamber 37 into the chamber 36 on the downward stroke of the piston, but which prevents the reverse flow of air during the upward stroke of the piston. Thus, only a few strokes of the piston will be sufficient to build up the pressure within the chamber 36 to provide a cushion for absorbing the shock either on landing or from the jolting movements of the wheels on taxiing over uneven ground.

To assist in controlling the maximum pressure of air which can be built up within the chamber 36 in its extended or unloaded position of Fig. 2, I provide an auxiliary chamber 40 preferably in the upper end of the cylinder 21, and I provide means for communication between the chamber 40 and the chamber 37. Such means may take the form of a conduit 41, the lower end of which is in communication with the chamber 37 at 42 and the upper end of which is attached at 43, Fig. 5, to a hollow member 44 which projects through the top walls 45 and 46 of the cylinder 21 and casing section 25 respectively. The member 44 preferably is internally threaded to receive a spindle 47 which extends therethrough and which is adapted to have the lower end thereof extend into the chamber 40, as is shown in Fig. 5. Communication is provided between the chamber 40 and the conduit 41 through the spindle 47 by an axially extending passageway 48 and a laterally extending passageway 49, the latter of which extends from the upper end of the passageway 48 to the wall of a reduced portion 50 on the spindle 47.

To vary the extent to which the chamber 40 acts as a controlling device, I provide a layer of oil 51 in the bottom of the chamber, the depth of which serves to govern the volume of air which can occupy the chamber 40, this being predetermined in accordance with the maximum pressure desired in the chamber 36, which would be known by a determination of the maximum load capable of being carried by the plane to which the device is attached. The oil level 51 is automatically maintained at the lower end of passageway 48 since excess oil is withdrawn into chamber 37 and subsequently forced past the packing 39 to become a part of the oil seal 38. The lower end of the passageway 48 is kept at the desired level of the oil 51 by adjusting the position of the spindle 47 with respect to the member 44, and for this purpose, the upper end of the spindle has a thumb nut 52 attached thereto and accessible for turning through a hand opening 53 in a wall of the casing extension 13. Leakage of air along the spindle 47 may be prevented by packing 54. In place of the chamber 40 and oil level adjustment, small auxiliary chambers or vessels of appropriate volumetric capacities may be interchangeably attached at the upper end of conduit 41.

The position of the parts shown in Fig. 4 illustrates the relationship while a plane is stationary on the ground. At such time the piston 20 is preferably sufficiently low within the cylinder 21 that a port 55 in the piston rod is beneath the top of the cylinder head 35. The port 55 is adapted to be in communication with the atmosphere whenever the pressure in chamber 37 is below atmospheric pressure, through passageway 56 which extends axially through the piston rod and port 57 which extends from the lower end of the passageway 56 to the wall of the piston rod in the chamber 58. A ball check valve 9 is preferably provided within the passageway to prevent loss of air or oil from the cylinder 21. The chamber 58 is normally open to the atmosphere through a breather pipe 59.

In practice the preferred arrangement is to so proportion the volume of the chamber 40 that when the piston 20 is at the bottom of its stroke, the pressure therein is less than the pressure in the chamber 36. Accordingly, air will not flow past the gasket 39 until such time as may be necessary to replenish air in the chamber 36 due to loss by leakage through the valve 93. Under normal conditions, that is, when the plane is standing with the piston 20 in the position shown in Fig. 4, the pressure in the chamber 40 is above atmosphere, but if leakage in the chamber 36 should develop, the piston 20 would rise therein and correspondingly reduce the pressure in the chamber 40, and, therefore, in the chamber 37 until it drops below atmospheric, whereupon air may enter past the ball check valve 9 and enter the chamber 37 through the port 55. Thus, at no time can the pressure in the chamber 37 and in the chamber 40 drop below that of atmospheric pressure.

The pressure may be built up additionally within the chamber 36 after the casing is attached to the airplane structure, and to the landing gear respectively merely by lifting the airplane structure with a crane until the piston 20 reaches the bottom of its stroke. At the start of the downward stroke, the pressure therebeneath was atmospheric, but due to the fact that the air in the chamber 37 is prevented from escaping into the atmosphere by the check valve 9, then as the piston 20 descends, the pressure in the chambers 37 and 40 is built up until it exceeds that in the chamber 36, whereupon air is displaced from the lower to the upper side of the piston. Then, when the plane is lowered thus causing the piston 20 to rise in the cylinder, more air will be drawn into the chamber 37 through the port 55 as soon as the pressure in the chambers 37 and 40 drops below atmospheric pressure. Then, on the second lifting operation of the plane, some of the additional air so admitted during the upward stroke of the piston is by-passed around the gasket 39 to the upper side of the piston. The parts are so proportioned that the quantity of air in the chamber 36 is built up to the desired degree after a few repeated raising and lowering operations of the plane. After the cylinder 36 has its initial charge, then subsequent charges are automatically injected to maintain the piston in approximately the same position while the plane is stationary, merely by the normal take-off movement thereof.

Metallic shock due to the striking of piston 20 against the cylinder head 35 is eliminated by a checking device comprising an annular rib 20a, on the piston, which has a very close fit with an annular groove 35a in the head 35 and thus brings the piston to rest as oil or air is displaced from the groove.

For additional cushioning effect and absorption of shock due to landing of the plane, a combination hydraulic and pneumatic device is provided which cooperates with the air cushion 36 just described and is under control of the pilot so as to be varied in accordance with the load of the plane. A cylinder of this device embodies the lower portion of the casing section 24, which defines the chamber 60 (Figs. 2 and 3) beneath the piston 23. Such piston is provided with oppositely facing packing cups 61 and 62 to prevent the passage of either liquid or air between the piston and the wall of the cylinder, wherefore any liquid, such as oil from a reservoir later described, drawn into the chamber 60 upon the upward stroke of the piston 23 is subsequently expelled from the chamber upon the downward stroke of the piston. The flow of liquid out of the chamber 60 is governed by the size of the discharge port 63, as well as by the force required to open the valve 64 against the restraining influence of a spring 65 and by the resisting action of a volume of entrapped air to be later described.

The loading on the spring may be governed by an adjustable abutment 66, movable within the cylinder 67 in which the spring 65 is located. The adjustable abutment 66 may be advanced or retracted to vary the loading on the spring 65 by employing a threaded shank 68 which extends through the cylinder head 69 and engages a correspondingly threaded opening therein. A packing 70 prevents the escape of fluid along the shank 68. The arrangement for controlling the piston-like abutment 66 is such that whenever the shank 68 is rotated, the piston is moved toward or away from the ball valve 64 as desired. Such rotation may be effected by one of many well known forms of remote control devices as for example, the illustrated flexible cable 71, the lower end of which is coupled, as at 72, to the shank 68 and the upper end of which is attached to an axle 73 (see Fig. 6), rigid with a gear 74. The gear may be mounted within a casing 75 located on the instrument panel 76 within the cockpit of the plane.

The airplane shown in Fig. 1 has four cushioning devices (two to each landing wheel). Accordingly, in Fig. 6, the casing 75 is shown as having four cables leading therefrom (one for controlling each cushioning device), and having the gear axes spaced equi-distantly from the axis of a central gear 77, which meshes with each of the gears 74 and which is rotatable by means of a knob 78. An indicator 79 on the knob indicates on a dial 80 the load setting based on the load in the plane at the time of operation thereof; the arrangement being such that rotation of the knob 78 simultaneously and to the same degree rotates the gears 74, and, therefore, all of the cables 71, thus altering the loading on all of the springs 65 to the same extent. Alternatively, the ball 64 and spring 65 could be eliminated and the size of the port could be adjusted by a valve member advanced or retracted by the threaded shank 68.

The combination hydraulic and pneumatic device includes a pressure chamber 85 which constitutes an extension on the casing section 24 and which is separated from the chamber 60 by the cylinder head 86. The chamber 85 acts as a reservoir for a liquid, such as oil, and for entrapped air, the air acting as a cushion on the downward stroke of the piston 23. The cylinder 60 extends partially into the chamber 85, thus forming a pocket 85a for the entrapped air about substantially the entire circumference as may be seen in Fig. 7.

When the plane is standing on the ground, the piston 23 is at the bottom of its stroke as is shown in Fig. 4, at which time all of the liquid in the chamber 60 has been forced through the port 63 into the reservoir 85. On the upstroke of the piston, however (caused by the weight of the landing wheel pulling casing section 24 downwardly with respect to the casing section 25, as soon as the plane starts to leave the ground on the take-off or upon rebound after a hard jolt due to uneven ground), liquid is drawn upwardly from the chamber 85 into the chamber 60, through the port 88 past the spring actuated check valve 89, where it is held until the subsequent settling of the airplane at the end of the hop tends to telescope the sections 24 and 25 against the action of the air cushion in the chamber 36 and the liquid and air cushions in the chambers 60 and 85. The escape of liquid from the chamber 60 is restricted by the spring loading on the valve 64 to a predetermined degree under the control of the pilot, the time required for the oil to flow out of the chamber 60 and therefore the velocity at which the plane is allowed to settle being thereby controllable.

To assure the flow of liquid and prevent escape of air from the reservoir 85 into the chamber 60, I have shown a cylindrical partition 90, having openings 91 in the bottom thereof, as extending from the top to the bottom of the reservoir and outside the confines of the valve opening 88. Thus the entrapped air within the reservoir 85 is rarified as the oil level therein is lowered and such air subsequently has a gradual retarding effect upon the velocity with which the oil can be forced back into the reservoir, since an increasing back pressure is produced which acts upon the ball valve 64. The retarding action of the entrapped air may be adjustably varied by the introduction or withdrawal of the proper quantity of air through the valve 92.

A brief description of the operation of the entire mechanism will now serve to correlate the functions of the various parts with each other. As previously mentioned, Fig. 4 illustrates the approximate position when the plane is resting on the ground and it will be seen that its weight, through the structural member 13 is borne by the air cushion in chamber 36. At this time the air within the chambers 37 and 40 is above atmospheric pressure, because the escape therefrom is prevented by the check valve 9.

Now, as the plane leaves the ground, the telescoped sections of the device are extended, due to the weight of the wheels and are caused to assume the position of Fig. 2. The air cushion 36 is allowed to expand as the piston 20 moves downwardly and the air below the piston is compressed into the volume defined by the conduit 41 and chamber 40. If the quantity of air present in the chamber 36, as referred to above is not quite sufficient, its pressure when expanded at this time will be slightly below that of the air below the cup packing 39 and some of the latter will pass the packing and bubble up through the oil seal to equalize the pressures and charge the chamber 36 with the desired quantity of air.

As an additional result of the extension of the telescoping sections, the trapped air in the pocket 85a is allowed to expand, forcing the oil in the reservoir 85 upwardly past the check valve 89 to fill the chamber 60 under the retracted piston 23. The parts remain in this position of Fig. 2 during flight of the plane. Fig. 3 illustrates the relative position of the parts immediately after the wheels have reached the ground, in landing, and the device has taken the weight of the descending plane. The air cushion 36 is immediately compressed to a volume which, due to the added momentum of the plane, may be considerably smaller than in the normal taxiing or rest condition. As the piston 20 moved upwardly, the air in chamber 40 and conduit 41 was allowed to expand to its original pressure. If, though, some had been previously used to recharge the air cushion, the pressure of the remainder would now be somewhat less than atmospheric, but in this case, the uncovering of port 55 would again equalize it.

The jolt, which would otherwise be experienced when the air cushion becomes so highly compressed under the additional momentum of the plane, as to lose its resiliency, is dissipated by the action of the air cushion in the chamber 85. Piston 23 is allowed to move downwardly first rapidly and then more and more slowly as the oil returns to the reservoir and the entrapped air above it becomes more and more compressed. The rapidity at the start of the action and the degree of subsequent retardation are dependent upon the ease with which the oil can escape past the ball valve 64 and, hence, upon the pressure of the spring 65. Upon coming in for a landing, the pilot merely adjusts the indicator 79, and, hence, the spring 65, according to the load which the plane is carrying; a heavier load, for instance, requiring a more resistive action to absorb the shock of its landing. As the plane finally settles down to its normal rest position, the parts reassume the position illustrated in Fig. 4.

An advantage of a device embodying my invention, as applied to an airplane, is the fact that the dead weight can be materially reduced; that the cushioning device is charged automatically by the movements of a plane during a normal take-off, and that the extent of the cushioning action upon alighting can be controlled by the pilot in accordance with the load at the time of alighting. As applied to bombing planes, the control feature is advantageous in that the pilot can vary the cushioning force by means of a conveniently located control member, thereby providing the most efficient conditions in the cushioning device for landing the plane under varying conditions of load at the time of alighting. Thus, if a plane should return to its field after having discharged only a portion of the bombing load, the cushioning device can be adjusted to suit the retained load merely by a simple adjustment which at all times is under the control of the pilot.

I claim:

1. A device for cushioning the landing of an airplane and embodying spaced fluid pressure devices each of which includes a cylinder and a piston, the pistons being connected by a single piston rod, an air chamber above one of the pistons and a second air chamber below said piston, and a storage chamber in communication with said second air chamber, and means for varying the air capacity of the storage chamber, said last-named means including a member that is settable from a point exteriorly of the storage chamber.

2. A device for cushioning the landing of an airplane and embodying spaced fluid pressure devices each of which includes a cylinder and a piston, the pistons being connected by a single piston rod, an air chamber above one of the pistons and a second air chamber below said piston, a chamber of selective air capacity in communication with said second air chamber, and an air passageway in said piston rod adapted, upon upward movement of the piston rod, to allow atmospheric air to enter the said second chamber, when the pressure in said chamber is below atmospheric pressure.

3. A device for cushioning the landing of an airplane and embodying spaced fluid pressure devices each of which includes a cylinder and a piston, the pistons being connected by a single piston rod, an air chamber above one of the pistons and a second air chamber below said piston, a chamber of selective air capacity in communication with said second air chamber, a volume of liquid within said chamber of selective air capacity and adjustable means to control the quantity of said liquid and thereby to control the said air capacity, said means acting automatically to remove excess liquid.

4. A device for cushioning the landing of an airplane and embodying spaced fluid pressure devices each of which includes a cylinder and a piston, the pistons being connected by a single piston rod, an air chamber above one of the pistons and a second air chamber below said piston, a chamber of selective air capacity in communication with said second air chamber by means of a conduit, a quantity of liquid within said chamber of selective air capacity and an adjustably extensible downwardly protruding portion of said conduit adapted to withdraw liquid from said last named chamber to thereby lower the level of said liquid to the lower end of said extensible portion before air can be withdrawn from said chamber.

5. A shock absorbing device operable by fluid under pressure for cushioning an airplane during the landing thereof, said device including an extensible casing, a cylinder within the casing having an upper and lower head, a piston within said cylinder defining a first chamber above said piston and a second chamber below said piston, a piston rod secured to the piston and extending through the lower head, a second piston on the rod within the casing defining a third chamber between it and the lower head, a transverse wall in the casing defining a fourth chamber between it and the second piston, a fifth chamber defined by the said wall and the lower end of said casing, compressed air within the first chamber, air within the second chamber compressed during a lowering of the first piston to escape past it into the first chamber and rarified by a raising of the first piston, atmospheric air within the third chamber, a passageway within said piston rod leading from the third chamber to the second chamber, liquid within the fifth chamber adapted to be drawn into the fourth chamber upon raising of the second piston, air also within the fifth chamber adapted to exert a back-pressure and thereby retard the return of liquid to the fifth chamber, a restriction in the path of the returning liquid, and means to control the restriction operable from within the airplane.

6. In a shock absorber, the combination of a piston and cylinder, the piston dividing the cylinder into two chambers one beyond the piston and the other about the piston rod, means for supplying air under pressure to the chamber beyond the piston, means including a passageway through the piston rod for connecting the chamber about the piston rod with the atmosphere to establish atmospheric pressure in the latter chamber, means operating consequent upon the movement of the piston to close the connection from the latter chamber to the atmospheric air, whereby the movement of the piston may compress air in the latter chamber to a pressure above that in the chamber beyond the piston, and means allowing the passage of air from the chamber about the piston rod past the piston into the chamber beyond the piston.

7. A shock absorber having a cylinder and piston and elastic fluid under pressure within the cylinder on one side of the piston, an external storage chamber of variable effective size in communication with the space within the cylinder on the other side of the piston, means for varying the effective size of said external chamber and thereby controlling the pressure obtainable on said other side of the piston, said means comprising a member having one end thereof extending adjustably into said external chamber and having the other end thereof projecting outside the chamber and accessible for adjusting the position of the member with respect to the chamber.

8. A cushioning device for use between two relatively movable members, comprising two cylinders mounted for telescopic movement with respect to each other on the respective members, one of the cylinders having a combined air and hydraulic unit therein, and the other cylinder having an air unit therein, means for automatically charging the air unit by the movement of one cylinder telescopically with respect to the other consequent upon movement of one member with respect to the other, and means for limiting the amount of air pressure which can be built up within said unit, said means including a volumetric control member that is settable exteriorly of the air unit.

9. A cushioning device having a cylinder and piston, the cylinder comprising a pressure chamber on one side of the piston, and elastic fluid under pressure within the pressure chamber on one side of the piston, means for automatically increasing the fluid pressure in said chamber upon movement of the piston in one direction therein, means for limiting the maximum pressure in said cylinder, said last-named means including an external storage chamber having communication with the side of the piston opposite the first-named chamber, and including means for establishing communication between the external chamber and the atmosphere only when the piston has moved a predetermined substantial distance to compress the fluid in said first-named chamber.

LUCIEN R. GRUSS.